United States Patent [19]

Ryan

[11] 4,133,283
[45] Jan. 9, 1979

[54] DIRECTIONAL FORCE SYSTEM FOR DIRECTIONALLY COUNTERING HORIZONTAL MOORING FORCES

[75] Inventor: William J. Ryan, Loreauville, La.

[73] Assignee: Ryan Ramp, Inc., New Orleans, La.

[21] Appl. No.: 757,755

[22] Filed: Jan. 7, 1977

Related U.S. Application Data

[63] Continuation-in-part of Ser. No. 501,991, Aug. 30, 1974, Pat. No. 4,003,473.

[51] Int. Cl.² ............................................. B63B 21/00
[52] U.S. Cl. ..................................... 114/230; 14/71.1
[58] Field of Search ................ 114/230; 188/282, 317; 14/71.1

[56] References Cited

U.S. PATENT DOCUMENTS

| 3,008,158 | 11/1961 | Stinson | 114/230 X |
| 3,139,852 | 7/1964 | Morris | 114/230 |
| 3,395,781 | 8/1968 | Trocki et al. | 188/282 |

Primary Examiner—Robert B. Reeves
Assistant Examiner—Edward M. Wacyra
Attorney, Agent, or Firm—C. Emmett Pugh & Associates

[57] ABSTRACT

A hydraulic reactor system for minimizing mooring forces of a vessel attached to an offshore structure, by means of a ramp which enables access between the two, comprising a structural frame provided with a hydraulic piston utilizing a one-way pressure relief valve which allows inward movement with minimal resistance. Conversely, the outward movement of the hydraulic piston provides considerable resistance. The device is connected to, or involved in, a ramp structure allowing an extension or reduction in length of the radius of the geometric configuration as it pivots vertically when attached to a vessel on its outboard end. The upward movement energizes the system by compressive action with minimal resistance, while the downward movement produces considerable resistance to outboard movement of the vessel. This vertical movement of the vessel caused by the waves produces reaction forces in a direction against those elements such as wind, waves and current that would tend to cause horizontal movement of the vessel. It is this process of gently nudging the boat in an up weather direction, with each of its downward movements, that causes an inertial reaction that overcomes the forces of the environment with minimal effort. The device can be pivotally attached to a mooring point, known as a "king post", allowing the device and attached ramp/vessel to "weathervane" about the "king post" responsive to changes in direction of the mooring forces.

14 Claims, 8 Drawing Figures

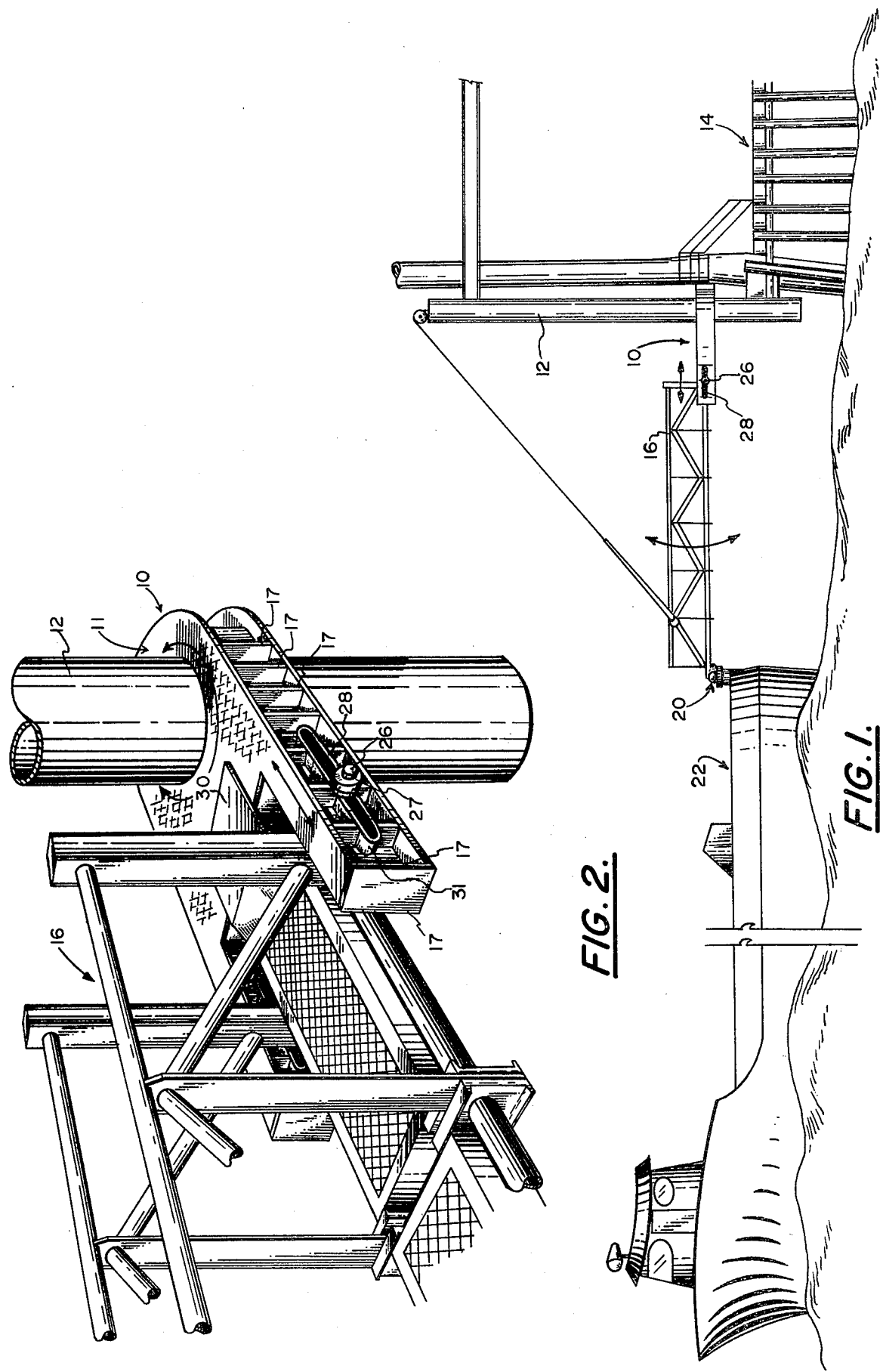

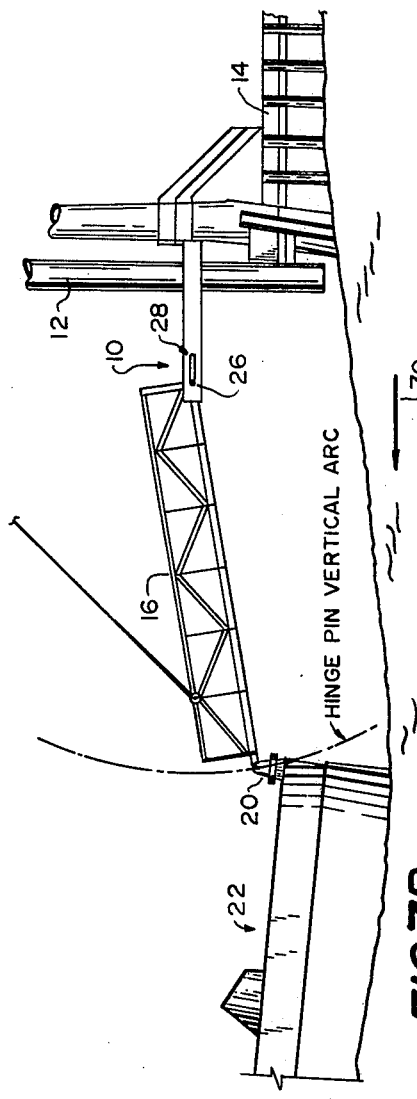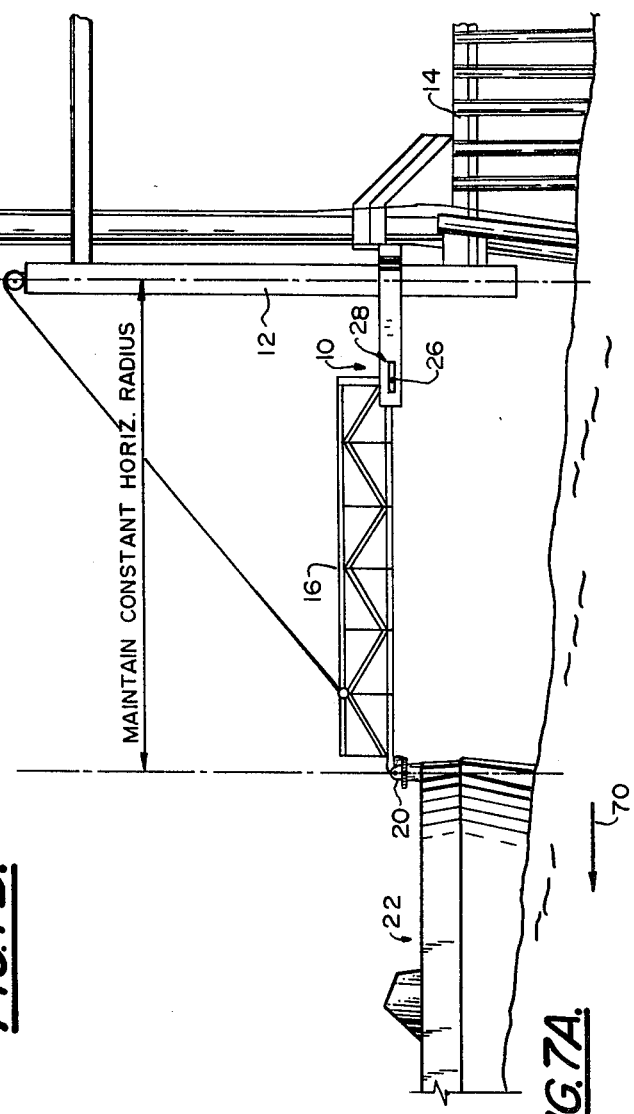
FIG. 7B.
FIG. 7A.

DIRECTIONAL FORCE SYSTEM FOR DIRECTIONALLY COUNTERING HORIZONTAL MOORING FORCES

REFERENCE TO RELATED APPLICATION

This application is a continuation-in-part of the prior copending application Ser. No. 501,991, filed Aug. 30, 1974 and entitled "Combined Marine Ramp and Transfer System" now U.S. Pat. No. 4,003,473 issued Jan. 18, 1977.

BACKGROUND OF THE INVENTION

1. Field of the Invention

The present invention relates to the mooring of vessels. More particularly, the present invention relates to a reacting device which counteracts mooring forces generated by adverse weather and wave conditions when the marine vessel is moored to a fixed dock or other mooring structure, especially when such mooring includes the attachment of a ramp structure for the transfer of personnel and/or materials between the vessel and a fixed platform such as for example an offshore oil platform.

2. General Background

One major problem facing the offshore industry today is the safe and efficient transfer of personnel and equipment between boats and the oil rig platforms.

A solution to this problem is disclosed in the parent application Ser. No. 501,991 (U.S. Pat. No. 4,003,473) which involves the mooring of a boat to the rig by means of a special ramp system. However, in mooring boats, particularly large ones in a heavy sea, great adverse mooring forces can be created under certain conditions.

As the oil and gas industry goes further offshore, wave heights in the neighborhood of six to eight feet are relatively commonplace and seas can become rougher. Additionally, high winds can become a negative factor. For example, in the North Sea, one can expect to be confronted with a wind blowing at twenty knots accompanied by fifteen-foot waves.

3. General Discussion of the Present Invention

The hydraulic reactor of the present invention is a device used in connection with for example a ramp structure to counteract the mooring forces of heavy displacement vessels. (See parent case Ser. No. 501,991 entitled "Combined Marine Ramp and Transfer System" by William J. Ryan, filed Aug. 30, 1974 (U.S. Pat. No. 4,003,473), for an example of a ramp system which can be utilized in conjunction with the hydraulic reactor of the present invention.) The apparatus tends to maintain the moored vessel at a constant horizontal radius about a "king" post to which the reactor apparatus is attached by sequentially applying a horizontal force on the moored vessel in the opposite direction of the "mooring forces" of wind, waves and current. These "mooring forces" exert varying horizontal forces on the vessel, trying to accelerate the vessel and thus move it in a direction away from its moored position. The sequential horizontal forces applied by the reactor on the vessel are applied intermittently, corresponding with the cycle time of each wave. Thus, a force is applied horizontally on the vessel and against the "mooring forces" when the vessel descends because the trough portion of a wave is supporting the vessel itself. No horizontal reacting force is applied when the vessel is ascending on the crest of a wave.

As an attached vessel rises from the bottom of a wave swell, the distance of the ramp configuration is reduced, while the vessel remains at a relatively constant horizontal radius. This vertical movement of the vessel will shorten the distance between the reactor and the point of attachment of the ramp to the vessel causing compression of the ramp moving the hinge pin portion of the present invention inward towards the "king" post to which it is attached. The preferred embodiment of the present invention is provided with a one way pressure release valve located in a hydraulic piston portion of the apparatus. The one way pressure release valve allows this inward movement with minimal resistance. Conversely, outboard movement of the hydraulic piston effects a closure of the one way valve, and further outward movement meets considerable resistance.

In operation, the device having the above characteristics will gently nudge the vessel in a direction towards the "king" post to which it is moored and against the mooring forces of wind, waves and other weather conditions which are trying to move the boat away from the "king" post. The vessel will meet minimal resistance from the apparatus of the present invention when the vessel is rising on a wave. In this situation the ramp connecting the vessel to the reactor structure will shorten, and the one-way valve will open allowing the ramp to slide inwardly on the hinge pin portion of the invention. However, as the vessel descends on a wave, the distance between the vessel and the reactor structure lengthens and the hinge pin portion tries to move outwardly away from the "king" post towards the vessel. It is this outward motion which closes the one-way release valve and exerts considerable resistance on the vessel. The vessel, being of great mass, overcomes the one-way release valve, but is moored a slight distance towards the "king post" to which the reactor device is attached. This slight "nudging" of the vessel towards the "king post" is accomplished by the exertion of considerable force on it. In an ideal situation, the force exerted on the vessel to urge it a minute distance towards the "king post" will exactly equal the distance which the vessel is moved away from the "king post" by the forces of wind, waves, and tide as the vessel rises and is only slightly effected by the reactor device at all. This would, in fact, occur when the force exerted on the vessel by "mooring forces" would be substantially equal to the force exerted on the vessel by the reactor.

Investigation of the movements of a boat in high waves, reveals that the vertical acceleration of the vessel, due to wave action, far exceeds its horizontal acceleration caused by the environment.

Vertical movements are primarily a function of buoyancy and gravity, being immediately responsive to changes in displacement.

Horizontal movements of a heavy displacement vessel are primarily a function of inertia. The greater the mass, the more resistant it is to the elements.

The operation of the hydraulic reactor is based on this differential of vertical and horizontal acceleration. The upward movements will energize the system by pushing the piston inboard, due to its inertia; whereas, the downward movement exerts the necessary resistance to counteract the elements that cause horizontal movement of the vessel.

It is this process of gently nudging the boat in an upweather direction, with each of its downward movements, that causes an inertial reaction that overcomes the forces of the environment with minimal effort.

The preferred embodiment of the present invention provides an outer structural frame, which slidably houses an inner hydraulic piston. The piston is equipped with a one-way flap type pressure release valve which allows inward movement with minimal resistance. Extensions of the piston are attachable to the end stringer portions of a boarding ramp. The connections between the ramp and the hydraulic piston are pivotable, allowing the dampening effect no matter what the arcuate position of the ramp may be. Such position will of course vary, depending on the position of the vessel to which the opposite end portion of the boarding ramp is attached. The entire structural frame can be attached to a structural "king" post which is rigidly affixed to the fixed structure to which the transfer of materials and/or personnel is to be effected.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 1 is a overall elevational view of an offshore marine vessel, and attached boarding ramp, and a structural "king" post to which the ramp is attached illustrating the use of the hydraulic reactor of the present invention at the connection between the ramp structure and the "king" post;

FIG. 2 is a partial perspective view of the preferred embodiment of the apparatus of the present invention;

FIGS. 7A and 7B are side views illustrating the operation of the preferred embodiment of the apparatus of the present invention.

DETAILED DESCRIPTION OF THE PREFERRED EMBODIMENT

Figure 3:
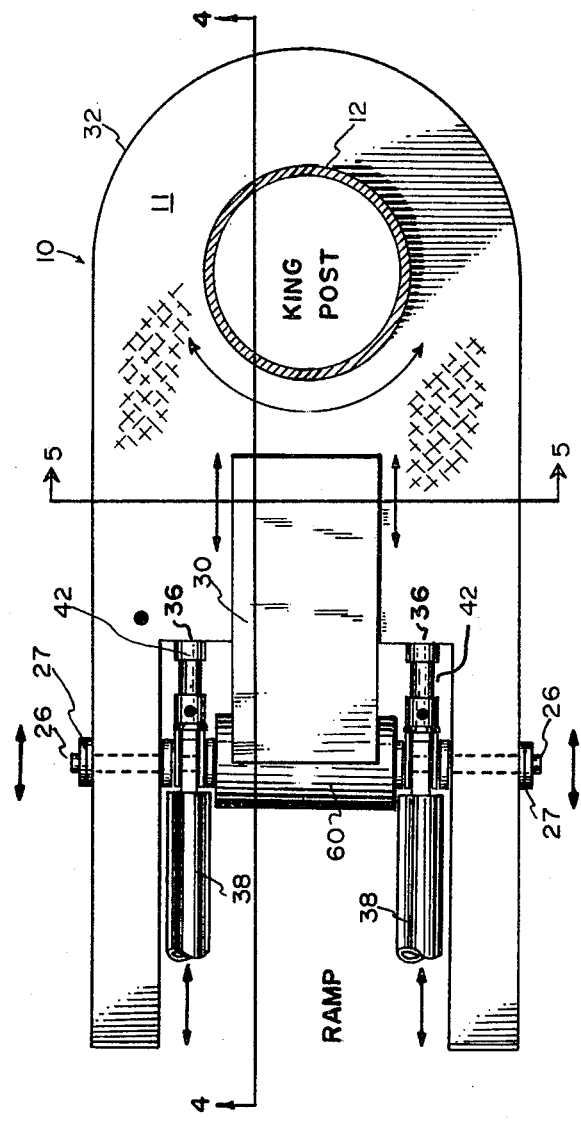
FIG. 3 is a plan view of the preferred embodiment of the present invention.

As can best be seen by FIGS. 1 and 2 of the drawings, the preferred embodiment of the apparatus of the present invention, designated generally by the numeral 10, is rotatably attached at one end portion to a structural "king" post 12 which is rigidly affixed to any desired fixed platform to which a marine vessel will be moored. In FIG. 1 the fixed platform is designated by the numeral 14.

The hydraulic reactor 10 is provided with attachments so that ramp structure 16 can pivotally attach to the apparatus of the present invention 10, allowing pivotal movement of the ramp 16 and attached vessel 22. The opposite end portion of the ramp structure 16 affixes at a connection 20 to any desired large offshore marine type vessel designated by the numeral 22 in FIG. 1.

Pivotal attachment of reactor 10 to "king" post 12 allows reactor 10 and an attached vessel 22 to "weathervane" about "king post" 12 with changing wind and wave action. For example, if "king post" 12 is at a corner, the vessel 22 could weathervane through an arc of approximately two hundred seventy degrees (270°).

FIG. 2 illustrates more closely the attachment of the apparatus 10 of the present invention to a "king" post structure 12 which is structurally and integrally connected to the offshore oil platform 14 or the like. In FIG. 2 ramp 16 is pivotally connected at pin 26 to the end portions of ramp 16. This pivotal connection at pin 26 is also a slidable connection, with connecting pin 26 being slidably retained in slot 28 by outer retaining rings 27. As can best be seen by the arrows in FIG. 2, ramp 16 can thus translate with respect to "king" post 12 by the sliding of shaft 26 in slot 28 (see arrows, FIG. 2).

The body portion of the hydraulic reactor 10 of the present invention is preferably constructed of a heavy structural metal, such as for example, structural steel. The upper portion, as is shown in FIG. 2, provides a deck 11 on which individuals can walk after leaving ramp 16. Deck portion 11 is provided with any type of non-skid surface to prevent slipping. In the preferred embodiment a check plate deck 11 is provided, which is of non-skid nature. At the junction of ramp 16 and the hydraulic reactor 10, a sliding deck 30 is provided for the transition between ramp 16 and reactor 10. Sliding deck 30 is pivotally connected to ramp 16 by pin 26 and allowed to slide upon the surface of deck 11 as will be more fully described hereinafter.

FIGS. 3-6 illustrate with more particularity the apparatus of the present invention 10. As can best be seen by FIG. 3, reactor 10 has an outer structural body 32 which can be pivotally attached to a supporting piling, referred to in the preferred embodiment of the present invention as "king" post 12. Body portion 32 has an upper deck 11 and a bottom 13. Structural side walls 15 are also provided. Side walls 15, as can best be seen in FIG. 5, can be for example conventional "I" beams of the size and strength necessary to sustain the mooring forces which may develop. Side walls 15 can be further reinforced using a plurality of stiffeners 17 at sufficient intervals as is known in the art.

The hydraulic reactor 10 of the present invention is provided with an inner hydraulic piston 41. As can best be seen by FIGS. 4-6, piston 41 is preferably rectangular having a plurality of inner connecting rods 42 to which the end portion of ramp 16 can be pivotally connected at hinge pin 26. Connecting rods 42 are connected (at their opposite end portions from the hinged connection) to piston web 43. Piston 41 as can best be seen by FIG. 4 is dimensioned to slidably travel with attached rods 42 on the inner portion of piston chamber 40. The chamber 40 can be filled with any conventional hydraulic fluid as needed to dampen the sliding effect of the piston 41 within piston chamber 40. Piston web 43 is provided with a valve flap 45. The action of flap 45 controls the reciprocating movement of piston 41. Flap 45 is pivotally connected, as can best be seen in FIG. 6, to piston web 43 by hinge pin 55. From an inspection of FIGS. 3-6, it can be seen by one skilled in the art that inward (i.e., towards the "king" post) movement of ramp 16 will meet minimal resistance, while outward movement of ramp 16 causes a closure of flap 45 and increased resistance to this outward movement.

Figure 5:
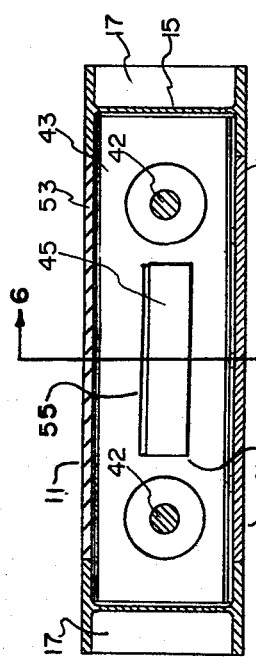
FIG. 5 is a sectional view taken along lines 5—5 of FIG. 3.
Figure 6:
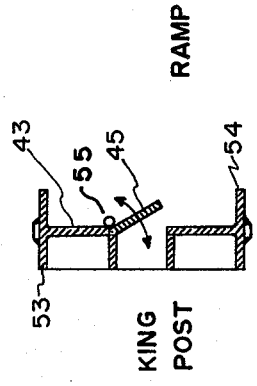
FIG. 6 is a sectional view taken along lines 6—6 of FIG. 5.

Piston 41 is so dimensioned as to form a loose fit with the inner walls of piston chamber 40, as can best be seen by FIG. 5. When piston 41 is urged outwardly, thereby shutting flapper valve 45 and causing maximum resistance of piston 41 with the dampening fluid in piston chamber 40, minimal fluid flow takes place around the outer edges of piston 41 through these spaces. The spacing allows limited fluid movement between the top and bottom flanges 53,54 respectively, of piston 41 as well as its ends.

The outer wall 35 of piston chamber 40 provides openings through which rods 42 sealably pass. Conventional type seals 36 insure a substantially fluid tight connection between connecting rods 42 and piston chamber 40.

Figure 4:
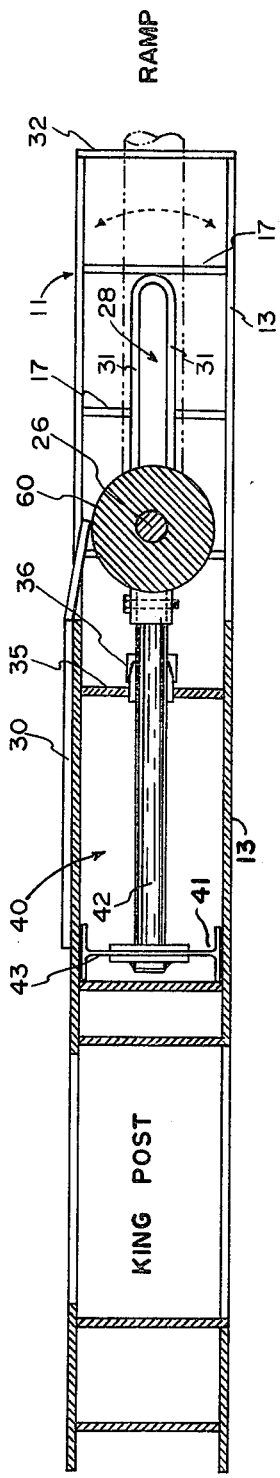
FIG. 4 is a sectional view taken along lines 4—4 of FIG. 3.

The end portion of rod 42 opposite piston 41 is pivotally attached at hinge pin 26 to the stringer portions, designated by the numerals 38 in FIG. 3, of ramp 16. Hinge pin 26 is provided with retainers 27 to fixedly retain pin 26 within slot 28. Slot 28 is an opening cut in side walls 15 and has a preferred thickness to correspond to the diameter of hinge pin 26. Slot 28 can be provided with a stiffening outer ring 31 about its periphery to give slot 28 the necessary structural rigidity to withstand forces transmitted to it through hinge pin 26. The peripheral stiffener ring 31 for slot 28 can best be seen in FIGS. 2 and 4.

When push rod 42 and piston 41 reciprocate, allowing the corresponding reciprocation of pin 26 in slot 28, sliding deck 30 will slide upon deck 11, since it is fixed on the tubular spacer 60 which can rotate on pin 26 between stringers 38 (See FIG. 3). Thus, a safe walkway is provided between ramp 16 and the deck portion 11 of reactor 10, notwithstanding the reciprocating position of hinge pin 26 and tubular spacer 60.

Method of Operation

FIGS. 7A and 7B best illustrate the method of operation of the preferred embodiment of the apparatus of the present invention 10. In FIGS. 7A and 7B a conventional offshore vessel 22 is moored to a fixed platform 14 by means of ramp 16, connected at its opposite end portions to boat connection 20 and reactor 10. The vessel 22 bobs upwardly and downwardly in response to wave action, causing an oscillation of the vessel and the end portion of ramp 16 at connection 20.

FIG. 7A illustrates the position of vessel 22, ramp 16 and hinge pin 26 at the crest of a wave. In this position, the ramp connects the shortest distance between vessel 22 at connection 20 and reactor 10 at pin 26. In FIG. 7A, it can be seen that this distance is substantially a horizontal straight line. However, as the end portion of vessel 22 at connection 20 begins to fall at the bottom of a wave or swell, connection 20 and the end portion of the boat will move downwardly and cause the end portion of ramp 16 to follow, thereby creating a greater distance between connection 20 and reactor 10. It can be seen from FIG. 7B that the extra distance necessary causes ramp 16 to pull on pin 26 and slide it to an outwardmost position in slot 28. The cycle of the bobbing vessel is completed when the next sequential wave urges the vessel upwardly as the crest of the wave hits the vessel, again shortening the distance between connection 20 and reactor 10, causing pin 26 to slide in an inward position within slot 28.

Absent other forces, this phenomena will continue, as the mass of the boat would hold it in the same position in a constant horizontal radius about "king" post 12.

However, other forces also act on vessel 22 besides the gravitational and buoyant forces as described above. These are the forces which act on the vessel in a primarily horizontal direction and include all the forces of weather such as wind, waves, current, and the like. These forces, collectively referred to hereinafter as "mooring forces", tend to move the vessel in a direction away from its desired spot adjacent the fixed platform.

While the vessel has a tremendous mass which will cause it to be moved very slowly, a great problem occurs when the vessel finally reaches "the end of its rope" and begins to exert a tremendous force component on the fixed platform itself when the vessel descends responsive to the trough of a wave.

The reactor 10 of the present invention produces a horizontal reactive component of force created when the vessel proceeds downwardly responsive to wave action. As can best be seen in FIG. 7B, when the vessel moves downwardly at the bottom or trough portion of a wave, its weight pulls the ramp 10 downwardly and since the horizontal distance of the boat at connection 20 from "king" post 12 remains constant, the ramp must slide outwardly to compensate for the increased diagonal distance between reactor 10 and boat 22 at connection 20.

The reactor 10 is provided with a one-way valve which is designed to provide resistance to this outward movement of the ramp. The reactor thus exerts a horizontal force component on the vessel which tends to urge or nudge it towards the fixed platform.

In an ideal sitaution, this reactive force would be designed to exactly offset the force which is exerted on the vessel by wind, wave action, current, and the like, referred to as the "mooring forces". It is these mooring forces designated by arrow 70 in FIGS. 7A and 7B which try to urge the vessel in a direction away from the fixed platform.

It would only be a matter of staight-forward engineering design to construct reactor 10 to be able to cope with any mooring force situation and maintain vessel 22 in a relatively constant horizontal radius about "king post" 12. Additionally, the mounting of reactor 10 in a rotational arrangement on "king post" 12 allows the vessel, ramp, and reactor to "weathervane" about "king post" 12 when the direction of mooring forces changes.

A cycle of the physical interactions which take place on the complete rise and fall of vessel 22 will be described hereinafter. Beginning with FIG. 7A as an illustration, the end portion of vessel 22 at connection 20 will be at its highest position as can best be seen in FIG. 7A at the crest of a wave. The pin portion 26 of reactor 10 would slide within slot 28 to an innermost position. By the design of flapper valve 45 (see FIGS. 5 and 6), it can be seen that this inward movement of pin 26 within slot 28 is met with minimal resistance, corresponding to the opening of flapper valve 45 which allows dampening fluid in cylinder 40 to flow freely as piston 41 moves inwardly.

As the crest of a wave passes and the trough approaches, vessel 22 begins to fall towards the bottom of the trough as does connection 20 and the end portion of ramp 16. While the horizontal radius remains constant, between connection 20 and "king post" 12, the distance diagonally between connection 20 and reactor 10 increases, and the vessel tries to pull on ramp 16 pulling pin 26 in an outwardmost position within slot 28. As the ramp urges the pin 26 outwardly, flapper valve 45 closes and maximum resistance is met, as the dampening fluid within chamber 40 is only able to flow around the outer edges of piston 41, a much smaller area than the area provided when flapper valve 45 is in an open position. Since the vessel is of tremendous mass, it is of course able to pull pin 26 close to the outermost position. However, there is a substantial amount of force exerted on vessel 22 which does "nudge" or urge vessel 22 in an up-weather direction a slight distance. This distance would then be lost when the vessel rises on the next sequential wave crest, as the reactor 10 exerts minimal force on vessel 22 when the vessel rises and pin 26 moves to an innermost position (position A) in slot 28. Flapper valve 45 opens and fluid freely flows through it with minimal resistance. During this inward movement of pin 26, and minimal force application to vessel 22 from reactor 10, the mooring forces in the direction of arrow 70 will urge the vessel away from "king post" 12 a small distance until it is re-nudged back to its original position on the next downward fall of the vessel with the next wave trough.

It can be seen from the above, that an idealized situation could possibly be created through engineering design whereby the vessel is maintained in approximately the same horizontal radius from "king post" 12. In fact, reactor 10 could be provided with an adjustability which would allow it to be controlled and the vessel moved gradually towards or away from the "king post" as needed with different weather conditions, wave heights, tides, wind, and the like.

This adjustability could be in the form of, for example, the change in volume of hydraulic fluid contained within dampening cylinder 40.

Another method of adjusting the resisting effect of reactor 10 could be a variable orifice provided to vary the volume of fluid which could flow through piston 43 in either the inward or outward direction. In fact, an operator could merely examine the "net" distance which the vessel was slowly moving and adjust the variable orifice to overcome the slow encrouchment of the vessel in any given direction.

The slot 28 through which pin 26 reciprocates should be dimensioned so as to allow sufficiently for the reciprocation of ramp 16 and its attached pin 26 therein. This would be a function of the length of the ramp, and the size of the waves at a given time. A well designed unit would of course provide for any weather conditions which might be expected in a given area.

Additionally, although the preferred embodiment has been described with respect to a vessel being moored about a point on a fixed structure, the present invention could be applied to a mooring system having multiple mooring points and reactors or to mooring a vessel to something other than a fixed structure such as for example mooring one vessel to another.

Because many varying and different embodiments may be made within the inventive concept herein taught, and because many modifications may be made in the embodiment herein detailed in accordance with the descriptive requirements of the law, it is to be understood that the details herein are to be interpreted as illustrative and not in a limiting sense.

What is claimed as invention is:

1. A system for minimizing or countering horizontally acting mooring forces tending to move a vessel away from a mooring structure while the vessel is moored to a mooring point on the mooring structure in an area subject to relatively high seas or waves comprising:
   (a) a frame attachable to the mooring point;
   (b) extendible, at least generally rigid attachment means relatively movable and pivotally attachable to said frame about a horizontal pivot axis for attaching and mooring the marine vessel to said frame, said attachment means allowing the moored vessel to move up and down a relatively large distance responsive to the crests and troughs of waves and lengthening and shortening as the vessel moves up and down, said extendible rigid attachment means being the only connection under tension between the vessel and the mooring structure
   (c) movement limit means associated with said attachment means for limiting the amount of extendability of said attachment means between the moored vessel and the mooring point; and
   (d) directional force means associated with said attachment means for relatively resisting relative movement between said frame and said attachment means in the horizontal direction to minimize the horizontally acting mooring forces, said directional force means substantially resisting relative movement in the direction of the movement which tends to increase the horizontal distance between the vessel and the mooring point but providing some but substantially less net resistance to relative movement in the opposite direction; the differential action of said force means diminishing the adverse horizontal mooring forces created by the vessel due to the sea or wave conditions and maintaining between successive seas or waves an at least generally constant horizontal separation distance between the attachment means and the mooring point within the limits of said movement limit means.

2. The system of claim 1, wherein said attachment means is an elongated structure, said structure being pivotally connected at one end portion to the vessel and at the other end portion to said frame.

3. The system of claim 1, wherein said frame is rotatably mounted on the mooring point, allowing the vessel to weathervane about the mooring point.

4. The system of claim 1, wherein said force means is comprised of:
   (a) a fluid containing chamber attached to said frame;
   (b) a piston slidably mounted within said fluid containing chamber; and
   (c) valve means associated with said piston for controlling the speed which said piston slidably travels through said fluid containing chamber, said attachment means being connected to said frame at said piston.

5. The system of claim 4, wherein said valve means is a one-way valve mounted in said piston.

6. The system of claim 5, wherein said one-way valve is a flapper valve.

7. The system of claim 4, wherein said fluid is a liquid.

8. The system of claim 1 wherein said movement limit means includes maximum and minimum horizontal separation distance limits formed by a rigid member movable between two other fixed rigid members, said directional force means at least assisting in preventing the movable rigid member from contacting the maximum separation rigid member and tending to move said movable rigid member toward the minimum separation rigid member.

9. The system of claim 8 wherein said attachment means is an extendible ramp.

10. The system of claim 8 wherein said limit means comprises a pin movable in a slot, said pin forming said movable rigid member and the terminal ends of said slot forming said fixed rigid members.

11. The system of claim 1 wherein said attachment means is attached to the vessel at one of the longitudinal ends of the vessel.

12. A method of minimizing or countering horizontally acting mooring forces tending to move a vessel away from a mooring structure while the vessel is moored to a mooring point on the mooring structure in an area subject to relatively high seas or waves comprising the steps of:

(a) providing a variable length, at least generally rigid elongated mooring system connectable to the mooring point;

(b) connecting the vessel to the mooring point through said elongated mooring system as the only connection under tension between the vessel and the mooring structure;

(c) allowing said elongated mooring system to lengthen and shorten between a maximum and minimum length under the actions of the vessel being moved up and down by the seas; and (d) resisting by a substantial force the lengthening of said mooring system but allowing said mooring system to shorten with some resistance but without such substantial resistance and maintaining between successive seas or waves an at least generally constant horizontal separation distance between the vessel and the mooring point within the maximum and minimum lengths.

13. The method of claim 12 wherein said mooring system includes a piston moving within a fluid, and wherein in step "d" the resistance is applied by the step of increasing the resistance of the piston moving through the fluid as the mooring system lengthens and is diminished by the step of decreasing the resistance of the piston moving through the fluid as the mooring system shortens.

14. The method of claim 12 wherein in step "b" there is included the step of having said elongated mooring system connected to the vessel at one of the longitudinal ends of the vessel.

* * * * *